United States Patent
Scheuerlein et al.

(10) Patent No.: US 7,230,472 B1
(45) Date of Patent: Jun. 12, 2007

(54) BASE CURRENT CANCELLATION FOR BIPOLAR JUNCTION TRANSISTOR CURRENT SUMMING BIAS VOLTAGE GENERATOR

(75) Inventors: Eric Scheuerlein, Los Gatos, CA (US); Mehmet Aslan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 56 days.

(21) Appl. No.: 11/248,892

(22) Filed: Oct. 11, 2005

(51) Int. Cl.
*G05F 1/10* (2006.01)
(52) U.S. Cl. ...................... 327/538; 327/512
(58) Field of Classification Search ............... 327/512, 327/513, 534, 535, 537, 538, 540, 541, 543
See application file for complete search history.

(56) References Cited

U.S. PATENT DOCUMENTS 5,686,858 A * 11/1997 Malherbe ................. 327/512
7,057,442 B2 * 6/2006 Hwang et al. ............. 327/538

* cited by examiner

*Primary Examiner*—Jeffrey Zweizig

(57) ABSTRACT

A circuit for creating a current complementary to absolute temperature comprises a first transistor and a second transistor. A resistor for generating a current complementary to absolute temperature has a first node coupled to the emitter of the first transistor and a second node coupled to the base of the first transistor. A first current mirror is coupled between the second node of the resistor and the emitter of the second transistor, the second transistor being used for replicating bias conditions of the first transistor. A second current mirror is coupled between the base of the first transistor and the base of the second transistor, and the second current mirror is used for canceling a base current of the first transistor.

20 Claims, 4 Drawing Sheets

400

---

RECEIVE MATCHING INPUT CURRENTS ON THE EMITTERS OF A FIRST AND SECOND TRANSISTOR.

410

---

MIRROR A CURRENT EQUAL TO THE INPUT CURRENT OF THE FIRST TRANSISTOR MINUS THE EMITTER CURRENT OF THE FIRST TRANSISTOR TO THE EMITTER OF THE SECOND TRANSISTOR WITH A FIRST CURRENT MIRROR.

420

---

MIRROR A BASE CURRENT FROM THE FIRST TRANSISTOR TO THE BASE OF THE SECOND TRANSISTOR WITH A SECOND CURRENT MIRROR.

430

---

MAINTAIN A VOLTAGE ON THE BASE OF THE SECOND TRANSISTOR AT AN EQUIVALENT LEVEL OF A VOLTAGE ON THE BASE OF THE FIRST TRANSISTOR.

440

---

CANCEL OUT THE BASE CURRENT OF THE FIRST TRANSISTOR BY DRAWING A CURRENT EQUAL TO THE BASE CURRENT OF THE FIRST TRANSISTOR FROM THE BASE OF THE FIRST TRANSISTOR WITH THE SECOND CURRENT MIRROR.

BASE CURRENT CANCELLATION FOR BIPOLAR JUNCTION TRANSISTOR CURRENT SUMMING BIAS VOLTAGE GENERATOR

TECHNICAL FIELD

Embodiments of the present invention pertain to analog circuit design, particularly to current and voltage source generation and current cancellation.

BACKGROUND ART

Many electronic circuit applications, especially at the integrated circuit level need a stable bias voltage or current for startup. For example, a clock needs a stable bias current and so does a circuit that generates a reference band gap voltage. Further, there is a need, especially at the chip level, to produce a stable bias voltage in a manner that does not take a lot of space on a wafer, does not require a clock on startup, and is stable across the operating temperature range of the device.

One approach to meeting these needs is to utilize Bipolar Junction Transistors (BJTs) that have a $V_{BE}$ relationship wherein the difference between the $V_{BE}$ of two different sized BJTs generates a current that is Proportional To Absolute Temperature ($I_{PTAT}$), or in other words increases with increasing temperature. Another portion of this circuit can be utilized to generate a current that is Complementary To Absolute Temperature ($I_{CTAT}$), or in other words decreases with increasing temperature. These two currents with essentially inverse temperature relationships can then be summed with each other to create a current that has a low or zero temperature coefficient. By sending this temperature stable current through a resistor, a voltage can also be obtained. In a perfect world, this would be a temperature stable voltage. However, because resistors have temperature coefficients, the resultant voltage will have a temperature coefficient even though it has been generated from a temperature stable current.

One method to get around this problem is described in a 1999 IEEE article by G. Ripamonti entitled, "Low Power— Low Voltage Band Gap References for Flash-EEPROM Integrated Circuits: Design Alternative and Experiments." This method suggests generating the two currents described above ($I_{PTAT}$ and $I_{CTAT}$). Equation 1 in Table 1 describes the creation of $I_{PTAT}$, while Equation 2 in Table 1 describes the creation of $I_{CTAT}$. For instance, $I_{PTAT}$ is created by a voltage across $R_P$ as shown by Equation 1, while $I_{CTAT}$ is created by a voltage across $R_C$ as shown by equation 2. The two currents through the resistors are then summed over a third resistors $R_{BIAS}$ as shown by Equation 3 in Table 1. The Ripamonti method suggests that if all three resistors are constructed of similar material and have similar characteristics, then the resulting voltage ($V_{BIAS}$) across $R_{BIAS}$ should be temperature independent. This is because the temperature dependencies due to the temperature coefficients of the resistors will cancel each other out and be removed from the ensuing voltage. Further, it is possible to alter the ratio of the currents ($I_{PTAT}$ and $I_{CTAT}$) by altering the size of the resistors $R_P$ and $R_C$ that are utilized to create the currents. This scalability is shown by Equation 4 of Table 1, where "A" represents a scalability factor for $R_P$ and "B" represents a scalability factor for $R_C$. This then allows for a fully scalable reference voltage value.

TABLE 1

Exemplary Current and Voltage equations

Where the current proportional to absolute temperature is represented as:

$$I_{PTAT} = \frac{\Delta V_{gs}}{R_P} \quad \text{equation 1}$$

And the current complementary to absolute temperature is represented as:

$$I_{CTAT} = \frac{V_{EB}}{R_C} \quad \text{equation 2}$$

Then, a bias voltage independent of temperature is represented as:

$$V_{BIAS} = R_s\left(\frac{\Delta V_{gs}}{R_P} + \frac{V_{EB}}{R_C}\right) \quad \text{equation 3}$$

The ratio of the currents used to used to create $V_{BIAS}$ can be altered as shown:

$$V_{BIAS} = R_s\left(\frac{\Delta V_{gs}}{R_P}A + \frac{V_{EB}}{R_C}\right) \quad \text{equation 4}$$

FIG. 1 is prior art and shows Ripamonti's proposed circuit for summing two currents that have opposing temperature coefficients (one proportional and one complementary) across a resistor to achieve a temperature stable bias voltage. One stage of this circuit generates a current proportional to absolute temperature ($I_{PTAT}$), another stage generates a current complementary to absolute temperature ($I_{VBE}$), and a third stage generates a bias voltage by summing the currents on a resistor. In most instances, in the portion of this circuit that is used for generating a current complementary to absolute temperature, the emitter current ($I_{VBE}$) of bipolar junction transistor Q1 is traditionally so large in comparison to the base current ($I_b$) of Q1, that the base current is considered negligible. In some instances, where it is difficult to achieve a negligible base current, Ripamonti recommends that careful selection of transistor Q1 and other components can take place during design, so that the base current is negligible at temperatures in the operating range of the device, thus resolving the problem.

However, in situations with very broad operating temperature ranges and/or severe design limitations, it is not practical or possible to design a circuit with a base current that is negligible in comparison to the emitter current that is generated on Q1. One example of a severe design limitation occurs when working with parasitic materials that only allow creation of BJT transistors with extremely low betas, such as a beta of approximately 2 or less. In other instances, when a very high accuracy is needed to create a highly accurate reference current or voltage, it is impossible that any base current could be considered negligible.

SUMMARY

A circuit for creating a current complementary to absolute temperature comprises a first transistor and a second transistor. A resistor for generating a current complementary to absolute temperature has a first node coupled to the emitter of the first transistor and a second node coupled to the base of the first transistor. A first current mirror is coupled between the second node of the resistor and the emitter of the second transistor, the second transistor being used for replicating bias conditions of the first transistor. A second current mirror is coupled between the base of the first transistor and the base of the second transistor, and the second current mirror is used for canceling a base current of the first transistor.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flowchart of a method of canceling a base current in a first transistor, according to an embodiment of the present invention.

DETAILED DESCRIPTION OF THE INVENTION

Reference will now be made in detail to embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalent, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Figure 1:
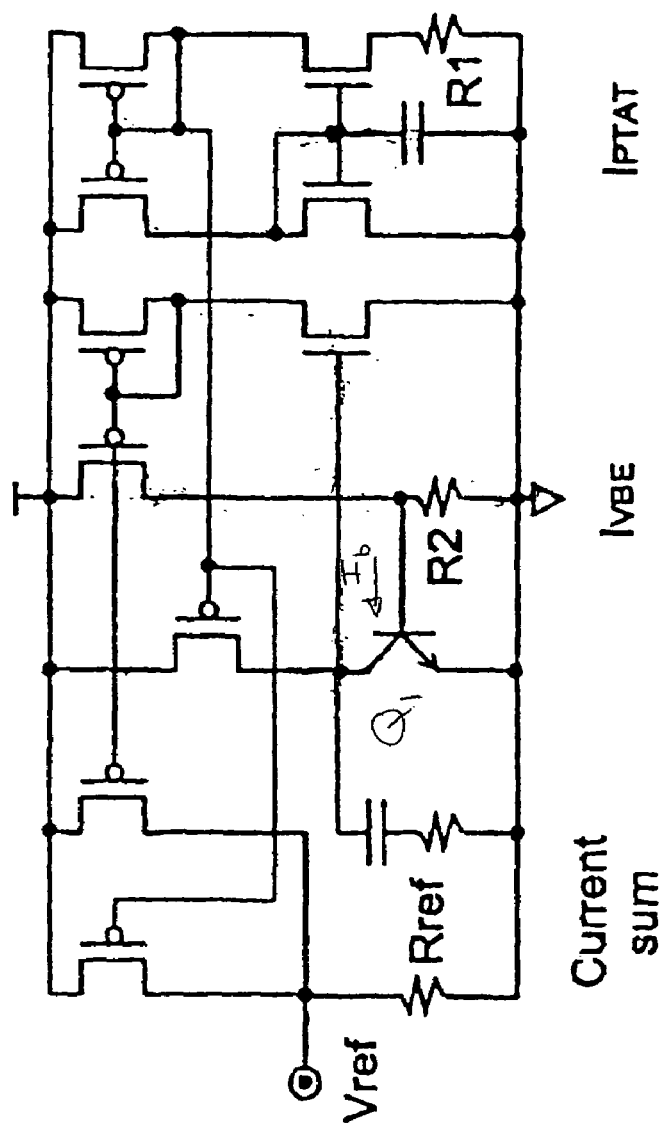
FIG. 1 is a prior art diagram of a circuit for generating a temperature stable bias voltage.

As previously described in conjunction with FIG. 1, some situations dictate that it is not possible or practical to design a circuit stage for generating a current complementary to absolute temperature, such that the base current of a transistor such as Q1 is negligible in comparison to its emitter current. In such a situation, or to simply increase the accuracy of the current complementary to absolute temperature produced at the emitter of Q1, it is therefore beneficial to cancel out the base current of transistor Q1. By canceling out the base current of transistor Q1, no component of the base current of transistor Q1 will be part of current $I_{VBE}$. Thus, the current complementary to absolute temperature ($I_{CTAT}$) that is generated by the circuit will have a higher accuracy, as will any corresponding current or voltage that is later derived from it.

Figure 2:
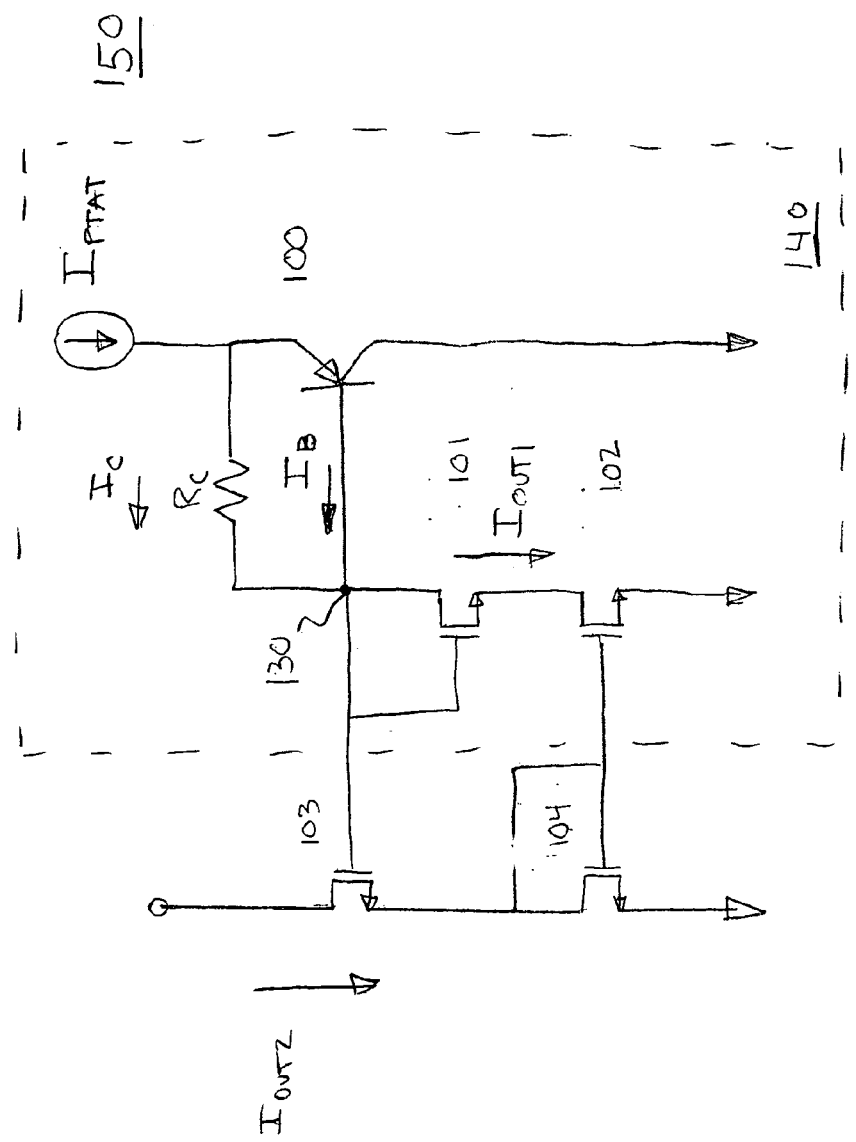
FIG. 2 is a diagram of an exemplary circuit to generate a current complementary to absolute temperature, according to one embodiment of the present invention.

FIG. 2 shows an exemplary circuit 150 for creating a current complementary to absolute temperature ($I_{CTAT}$). A dashed box surrounds circuit 140, which is a portion of circuit 150 that will be also appear in FIG. 3 and be discussed further. FIG. 2 is comprised of a resistive element Rc, a transistor element such as Positive-Negative-Positive (PNP) Bipolar Junction Transistor (BJT) 100, and four other transistors such as n-type metal-oxide-semiconductor field effect transistors (NMOSFET or NMOS transistors) 101, 102, 103, and 104. An input current such as $I_{PTAT}$, which is a current proportional to absolute temperature, is received at the emitter and a first node of $R_C$. One branch of $I_{PTAT}$ flows through transistor 100 with part of the current traveling on through the collector of transistor 100 to ground. Another portion of the current flows through the base of transistor 100, which is coupled to node 130, and creates the current $I_B$. A third branch of $I_{PTAT}$ flows though a first node of $R_C$ that is coupled to the emitter of transistor 100, and creates the current $I_C$. $I_C$ is a current complementary to absolute temperature ($I_{CTAT}$). Current $I_C$ flows through resistor Rc, which has a second node coupled to node 130. Currents $I_C$ and $I_B$ flow together through the drain of 101.

A pathway exists through transistors 101 and 102, and allows the combined current ($I_{OUT1}$), that does not flow to transistors 101 and 103 to flow onward to ground. Transistor 101, when properly biased, allows current to flow from its drain to its source. The source of transistor 101 is coupled to the drain of transistor 102. When properly biased, transistor 102 allows a portion of the current to flow from its drain to its source, and then on toward ground.

A second pathway toward ground exists through transistors 103 and 104. Current ($I_{OUT2}$) from a connection to a larger circuit, which circuit 150 may be a part of, flows into the drain of transistor 103. The source of transistor 103 is coupled to the drain and gate of transistor 104 and to the gate of transistor 102. When properly biased, transistor 103 allows $I_{OUT2}$ to flow on to the drain of transistor 104. When properly biased, transistor 104 allows $I_{OUT2}$ to flow onward toward ground through the source of transistor 104.

If similar resistive material is utilized elsewhere, in a larger circuit that circuit 150 may be coupled to, to create the resistors $R_P$ (used to generate the $I_{PTAT}$) and $R_S$ (used to sum the $I_{PTAT}$ and $I_{CTAT}$), then $I_C$ can be removed from the circuit of FIG. 2, and summed over $R_S$ to create a voltage, $V_{BIAS}$, that has no temperature dependencies. A problem that arises in this method is that in a BJT circuit designed to produce a current complementary to absolute temperature ($I_{CTAT}$), the current that is utilized for $I_{CTAT}$ is derived from $I_C$. However, as the arrangement of components shows, the current $I_C$ and the base current $I_B$ flow together, making it impossible to remove $I_C$ without also removing $I_B$ at the same time.

The circuit of FIG. 2, while constructed differently than the Ripamonti circuit of FIG. 1, suffers a similar problem, namely an undesirable base current on transistor 100 that is not negligible in comparison with the emitter current of transistor 100 in all design scenarios. For instance, in situations with very broad operating temperature ranges and/or severe design limitations, it is not practical or possible to design a circuit with a base current that is negligible in comparison to the current emitter current that is generated through $R_C$ with a circuit such as circuit 140. One example of a severe design limitation occurs when working with parasitic materials that only allow creation of BJT transistors with extremely low betas, such as a beta of approximately 2 or less. In other instances, when a very high accuracy is needed to create a highly accurate reference current or voltage, it is impossible that any base current could be considered negligible.

Figure 3:
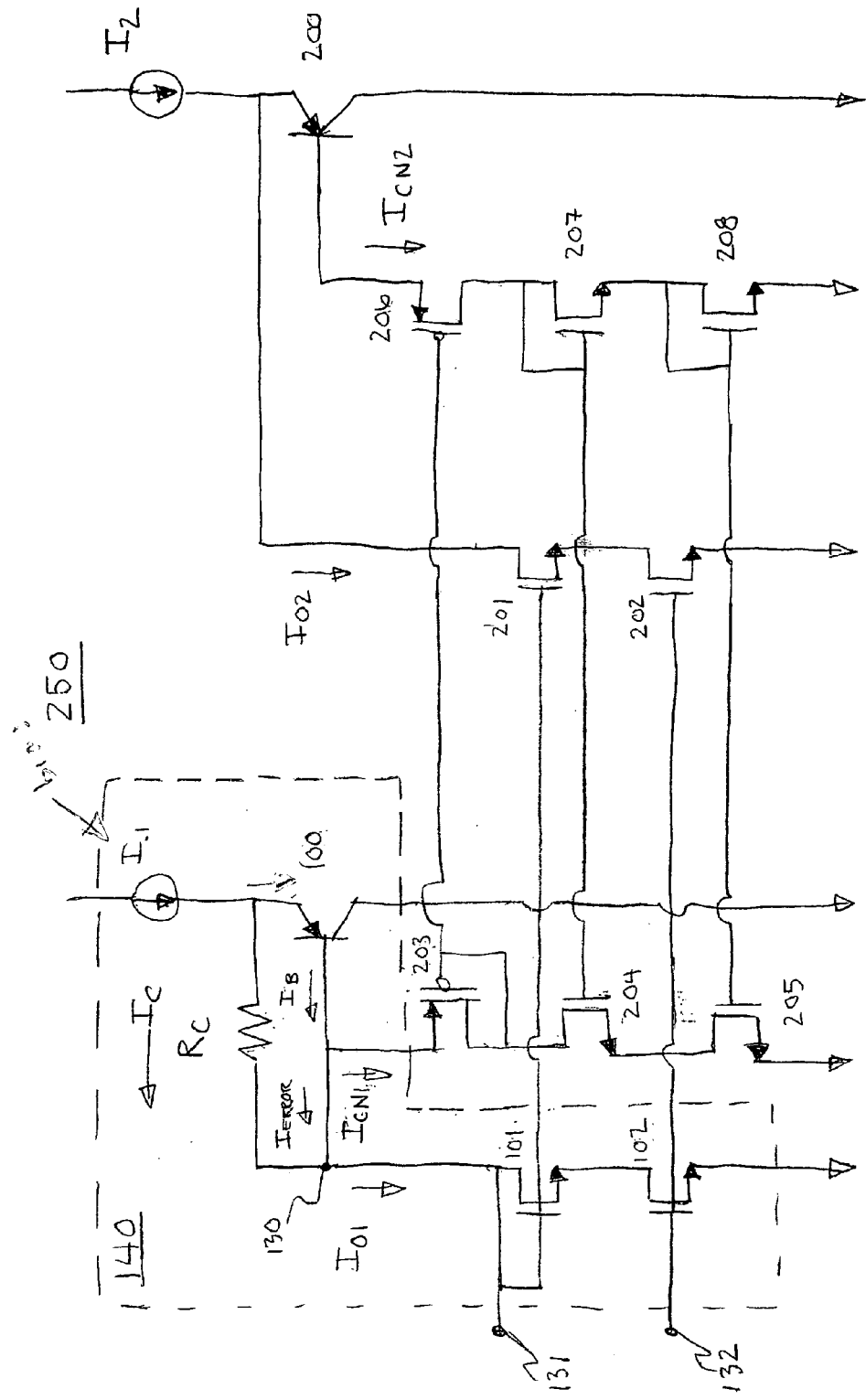
FIG. 3 is a diagram of an exemplary circuit to generate a current complementary to absolute temperature while canceling an undesired base current, according to one embodiment of the present invention.

FIG. 3 is a diagram of an exemplary circuit 250 to generate a current complementary to absolute temperature while canceling an undesired base current, in accordance with one embodiment of the present invention. In one embodiment of the present invention, circuit 250 is a portion of a larger circuit. In one embodiment of the present invention, circuit 250 is formed as a CMOS (Complementary Metal Oxide Semiconductor) integrated circuit.

Circuit block 140 of FIG. 3, shown by the dashed block, forms a first stage of circuit 250. Circuit 140 is comprised of a resistive element Rc, a transistor element such as PNP Bipolar Junction Transistor (BJT) 100, and two other transistors such as NMOS transistors 101 and 102.

A current source $I_1$ is coupled to the first node of resistor Rc and the emitter of transistor 100. The base of transistor 100 is coupled through node 130 to: a second node of resistor Rc; to node 131 (which allows coupling to larger circuits which circuit 250 may be a part of); to the drain and gate of transistor 101; and to the gate of transistor 201. The base of transistor 100 is also coupled to the source of transistor 203. The collector of transistor 100 is coupled to ground.

Resistor Rc has a second node, which is coupled through node 130 to: the drain and gate of transistor 101; to the base of transistor 100; to the source of transistor 203; to the gate of transistor 201; and to node 131 (which provides a connection to a larger circuit which circuit 250 may be a portion of). The source of transistor 101 is coupled to the drain of transistor 102. The gate of transistor 102 is couple to the gate of transistor 202 and also to node 132 (which provides a coupling to a larger circuit which circuit 250 may be a part of). Node 132 also provides an input voltage to bias the gate of transistor 102. The source of transistor 102 is coupled to ground.

An input current $I_1$, which can be comprised of a current proportional to absolute temperature, is received at the emitter of transistor 100 and a first node of $R_C$. One branch of $I_1$ flows through transistor 100 with part of the current traveling on through the collector of transistor 100, which is coupled to ground. A second portion of current $I_1$ flows through the base of transistor 100 and creates the current $I_B$. A third portion of $I_1$ flows through a resistor $R_C$, which is coupled between the emitter and base of transistor 100 through node 130, and creates the current $I_C$.

Current $I_{ERROR}$, which is comprised of $I_B$ minus $I_{CN1}$, flows together with $I_C$ to create current $I_{O1}$. $I_{O1}$ flows through the drain of transistor 101 and then on toward ground through transistor 102. In one embodiment of the present invention, $I_{O1}$ comprises a current complementary to absolute temperature ($I_{CTAT}$), which can be provided as an output to be utilized by a larger circuit that circuit 250 may be coupled to.

In embodiments of the present invention, additional components are coupled to circuit 140 to provide for canceling out the base current (represented in FIG. 3 as $I_B$) of transistor 100. In the embodiment shown in circuit 250, these additional components comprise nine transistors, in the form of PNP BJT 200; NMOS transistors 201, 202, 204, 205, 207, and 208; and P-type MOSFETs (PMOSFETs or PMOS transistors) 203 and 206. It is appreciated that in other embodiments, different components and different arrangements of components may be utilized to perform the same function as these additional components.

In a circuit such as circuit 250, transistors 100 and 200 are comprised of matching/identical transistors. In embodiment, transistors 100 and 200 comprise identical PNP BJT transistors. Additionally, current $I_1$ and current $I_2$ are identical input currents. In one embodiment of the present invention, current $I_1$ and current $I_2$ each comprise currents proportional to absolute temperature ($I_{PTAT}$) which are created in a stage of a larger circuit that circuit 250 may be a portion of.

In a second stage of circuit 250, transistors 201 and 202 are coupled to transistors 101 and 102 and configured as a current mirror to mirror out the current $I_{O1}$ from circuit block 140 to the emitter of transistor 200. Current $I_{O1}$ represents the input current ($I_1$) less the emitter current of transistor 100 (which equates to $I_C$ without the $I_B$ component as will be seen later), and is mirrored to create the same current at the emitter of transistor 200 in the form of current $I_2$–$I_{O2}$. Additionally, the current mirror formed by transistors 201 and 202 acts to keep the emitter currents of transistors 100 and 200 (which are matching transistors) equal to one another. Transistors 201 and 202 provide a pathway toward ground for a portion ($I_{O2}$) of the current $I_2$ that is coupled to the emitter of transistor 200 as an input.

In this second stage of circuit 250, the drain of transistor 201 is coupled to the emitter of transistor 200. The gate of transistor 201 is coupled to the gate and drain of transistor 101, the source of transistor 203, the base of transistor 100, and the second node of resistor $R_c$. The source of transistor 201 is coupled to the drain of transistor 202. The drain of transistor 202 is coupled to the source or transistor 201. The gate of transistor 202 is coupled to the gate of transistor 102. The source of transistor 202 is coupled to ground.

In a third stage of circuit 250, transistors 203, 204, 205, 206, 207, and 208 are configured as a bootstrapped current mirror (a current mirror and voltage amplifier). The current mirroring function uses a replica biasing technique to harvest the base current from transistor 200 and utilize it to remove the base current of transistor 100 from the signal path of circuit 140. The current mirror formed by transistors 203, 204, 205, 206, 207, and 208, acts to keep the base currents of transistors 100 and 200 (which are identical transistors) equal to one another. The current mirroring function is used to "pull out" the base current ($I_B$) of transistor 100 as $I_{CN1}$ on the source of transistor 203. In other words, $I_B$ is mirrored to create the same current, in the form of $I_{CN2}$, at the base of transistor 200. In addition, the source of transistor 203 draws a current $I_{CN1}$, which is equal $I_B$. In circuit 250, transistors 203, 204, and 205 provide a pathway toward ground for a portion of the current $I_{CN1}$ (which is equal to $I_B$ minus $I_{ERROR}$) that is drawn from the base of transistor 100 into the source of transistor 203. Also in circuit 250, transistors 206, 207, and 208 form a pathway toward ground for $I_{CN2}$, the mirrored current on the base of transistor 200.

Transistors 203, 204, 205, 206, 207, and 208 also act as a feedback amplifier to bias the voltage on the base of transistor 200, to ensure that it is equivalent to the voltage on the base of transistor 100. Though circuit 250 demonstrates this amplifying, it would not be necessary to incorporate an amplifier in an embodiment of the present invention utilized in a situation where the effects of the collector-base voltage on transistor 200 are considered negligible.

In this third stage, the source of transistor 203 is coupled to the base of transistor 200, the drain and gate of transistor 101, the gate of transistor 201, and the second node of resistor $R_C$. The gate of transistor 203 is coupled to the gate of transistor 206, the drain of transistor 203, and the drain of transistor 204. The drain of transistor 204 is coupled to the drain and gate of transistor 203 and to the gate of transistor 206. The gate of transistor 204 is coupled to the gate and drain of transistor 207 and the drain of transistor 206. The source of transistor 204 is coupled to the drain of transistor 205. The gate of transistor 205 is coupled to the gate and drain of transistor 208, and to the source of transistor 207. The source of transistor 205 is coupled to ground.

Also in this third stage, the source of transistor 206 is coupled to the base of transistor 200. The gate of transistor 206 is coupled to the gate and drain of transistor 203, and also to the drain of transistor 204. The drain of transistor 206 is coupled to the drain and gate of transistor 207, and also to the gate of transistor 204. The drain of transistor 207 is coupled to the gate of transistor 207, the drain of transistor 206, and the gate of transistor 204. The gate of transistor 207 is coupled to the drain of transistor 207, the drain of transistor 206, and the gate of transistor 204. The source of transistor 207 is coupled to the drain and gate of transistor 208 and to the gate of transistor 205. The drain of transistor 208 is coupled to the gate of transistor 208, the gate of transistor 205, and the source of transistor 207. The gate of transistor 208 is coupled to the drain of transistor 208, the source of transistor 207, and the gate of transistor 205. The source of transistor 205 is coupled to ground. Finally, the collector of transistor 200 is coupled to ground.

The entirety of circuit 250 acts to provide base current cancellation for the base current ($I_B$) of transistor 100. Cancellation is accomplished by creating a replica circuit for transistor 100 with transistor 200. By supplying the same emitter current and $V_{EB}$ to transistor 200, which is a matching transistor to transistor 100, the same base current is produced on transistor 200 as on transistor 100. In some CMOS processes, the direct current (DC) bias point of a BJT, which is comprised of the $V_{BC}$ and $V_{EC}$, has a significant impact on the Beta and the base current of transistor 200. It is therefore necessary in some embodiments, as shown in circuit 250, to insure that the matching BJT transistors (transistors 100 and 200) see the exact same conditions in regard to all three of their terminals. Circuit 250 sets the terminals of transistors 100 and 200 to the same conditions by: injecting equivalent currents into the emitter nodes of transistors 100 and 200 in the form of $I_1$ and $I_2$; mirroring the bias current less the emitter current of transistor 100 in the form of $I_{o1}$, to the emitter node of transistor 200 in the form of $I_{o2}$; by mirroring the current $I_{CN1}$ from the base of transistor 100 to the base of transistor 200 in the form of $I_{CN2}$; by ensuring the base voltages on transistor 100 and 200 are equal; and by coupling the collectors of transistors 100 and 200 to ground.

From the architecture of circuit 250 and from the description above, it can be seen that $I_1=I_2$; that $I_{o1}=I_{o2}$; and that $I_{CN1}=I_{CN2}$. If it is assumed that $I_{ERROR}$=zero (which is the only stable operating condition for circuit 250), it follows that since $I_1=I_2$, transistors 100 and 200 will have identical emitter currents. Additionally, since transistors 100 and 200 are identical and have the same emitter currents, it follows that transistors 100 and 200 will have the same base to emitter voltage ($V_{BE}$). Since the third stage of circuit 250 is comprised of a bootstrap current mirror that sets $I_{CN1}$ equal to $I_{CN2}$, while simultaneously acting as a feedback amplifier, it is also assured that transistors 100 and 200 have the same base voltage ($V_B$). Finally, since the collectors on transistors 100 and 200 are both grounded, it is assured that they each see the same base, collector, and emitter voltages. Therefore, the BJT transistors 100 and 200 are biased in the exact same manner and have the same base current. Because all of the base current of transistor 200 flows through transistor 206 in the form of $I_{CN2}$, all of the base current ($I_B$) of transistor 100 is likewise required to flow through transistor 203 (in the form of $I_{CN1}$).

Because circuit 250 causes $I_{CN1}$ to be equal to $I_B$, this means that $I_B$ on transistor 100 is effectively cancelled out, or pulled out of the circuit path of circuit 140. Consequently $I_{ERROR}$ will be equal to zero. When $I_{ERROR}$ equals zero, no component of the base current of transistor 100 is present in $I_{o1}$. Thus instead of having a negligible base current component, circuit 250 operates to cancel the base current component out of the current complementary to absolute temperature ($I_{CTAT}$) that $I_C$ and $I_{o1}$ represent in one embodiment of the present invention. This allows a highly accurate $I_{CTAT}$ to be produced and harvested, or mirrored out from node 130 or from the emitter of transistor 200. This current complementary to absolute temperature can then be summed with a current proportional to absolute temperature to create temperature stable reference currents and bias voltages.

In one embodiment of the present invention, stages two and/or three of circuit 250 can be comprised of other simpler or more complex MOSFET designs for the current mirrors to achieve the over all effect of canceling the base current of transistor 100. In one embodiment, the current mirror of stage three of circuit 250 (which is comprised of transistors 203, 204, 205, 206, 207, and 208) can be replaced with a separate current mirror that operates in conjunction with an amplifier or feedback amplifier. In such an embodiment, the current mirror operates to replicate the base current of transistor 100 at the base of transistor 200, while the amplifier amplifies the emitter base voltage ($V_{EB}$) of transistor 200 to and acts to ensure that it remains equal to the $V_{EB}$ of transistor 100.

FIG. 4 shows a flowchart 400 of a method of canceling a base current in a first transistor, according to an embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

In 410 of flowchart 400, in one embodiment, matching input currents are received at the emitters of a first transistor and a second transistor. In one embodiment, the matching input currents comprise currents proportional to absolute temperature. In one embodiment the emitter of the first transistor is coupled to a resistor for generating a current complementary to absolute temperature. In one embodiment, as shown in FIG. 3, the first transistor 100 and the second transistor 200 are matching PNP BJT transistors. In one embodiment, the first transistor 100 and second transistor 200 are formed of parasitic material in an integrated circuit. The second transistor 200 is used for replicating bias conditions of the first transistor 100. Although not exemplified by the present embodiment, the replica bias circuit can be smaller by a given scale factor as long as the mirror of step 430 reverses this scale factor.

In 420 of flowchart 400, in one embodiment, a current equal to the input current from the first transistor minus the emitter current from the first transistor is mirrored to the emitter of the second transistor with a first current mirror. In one embodiment, this first current mirror is formed of MOSFET devices in an integrated circuit. In one embodiment, this first current mirror is formed of NMOS transistors in an integrated circuit, such as transistors 101, 102, 201, and 202 in FIG. 3. The first current mirror causes the emitter current on the second transistor 200 to be equal to the emitter current on the first transistor 100.

In 430 of flowchart 400, in one embodiment, a base current from the first transistor is mirrored to the base of the second transistor with a second current mirror. In one embodiment, this second current mirror is formed of formed of MOSFET devices in an integrated circuit. In one embodiment, this second current mirror is formed of PMOS and NMOS transistors in an integrated circuit, such as PMOS transistors 203 and 206 and NMOS transistors 204, 205, 207, and 208 of FIG. 3.

In 440 of flowchart 400, in one embodiment, a voltage equivalent to the voltage on the base of the first transistor is maintained on the base of the second transistor. In one embodiment, the voltage on the base of the second transistor is maintained by an amplifying function of the second current mirror.

In 450 of flowchart 400, in one embodiment, the base current of the first transistor is cancelled out by drawing a current equal to the base current from the base of the first transistor with a portion of the second current mirror. In one embodiment, a base current is drawn out by a PMOS transistor (such as 203 of FIG. 3), which is part of the second current mirror and has a source coupled to the base of the first transistor (such as 100 of FIG. 3).

Embodiments of the present invention are thus described. While the present invention has been described in particular embodiments, it should be appreciated that the present invention should not be construed as limited by such embodiments, but rather construed according to the below claims.

What is claimed is:

1. A circuit for creating a current complementary to absolute temperature, said circuit comprising:
    a first transistor;
    a resistor comprising a first node coupled to an emitter of said first transistor and a second node coupled to a base of said first transistor, wherein said resistor is for generating a current complementary to absolute temperature;
    a first current mirror coupled between said second node of said resistor and an emitter of a second transistor, wherein said second transistor is for replicating bias conditions of said first transistor; and
    a second current mirror coupled between said base of said first transistor and a base of said second transistor, wherein said second current mirror is for canceling a base current of said first transistor.

2. The circuit of claim 1, further comprising matching input currents on said emitter of said first transistor and an emitter of said second transistor.

3. The circuit of claim 2, wherein said matching input currents comprise currents proportional to absolute temperature.

4. The circuit of claim 1, wherein said first transistor and said second transistor are comprised of matching transistors.

5. The circuit of claim 4, wherein said first transistor and said second transistor are comprised of Positive-Negative-Positive Bipolar Junction Transistors (PNP BJTs).

6. The circuit of claim 1, wherein said first current mirror comprises a circuit for causing an emitter current on said second transistor to be equivalent to an input current on said first transistor minus a current through said resistor.

7. The circuit of claim 1, wherein said second current mirror comprises a circuit for causing a base current on said second transistor to be equivalent to said base current on said first transistor.

8. The circuit of claim 1, wherein said second current mirror further comprises an amplifier circuit coupled between said base of said first transistor and said base of said second transistor.

9. The circuit of claim 8, wherein said amplifier comprises a feedback amplifier for maintaining a base voltage on said second transistor equivalent to a base voltage on said first transistor.

10. A circuit for canceling a base current of a first transistor, said circuit comprising:
    a second transistor;
    a first current mirror, wherein said first current mirror is for mirroring a bias current less an emitter current from said first transistor to the emitter node of said second transistor; and
    a second current mirror coupled between a base of said first transistor and a base of said second transistor, wherein said second current mirror cancels said base current of said first transistor by drawing a current equivalent to said base current from said coupling to said base of said first transistor.

11. The circuit of claim 10, wherein said second current mirror further comprises an amplifier for maintaining a base voltage on said second transistor equivalent to a base voltage on said second transistor.

12. The circuit of claim 10 wherein said second transistor is comprised of a matching transistor to said first transistor.

13. The circuit of claim 12 wherein said second transistor is a Positive-Negative-Positive Bipolar Junction Transistor (PNP BJT).

14. The circuit of claim 10, wherein said first current mirror is comprised of Metal Oxide Semiconductor Field Effect Transistors (MOSFETs).

15. The circuit of claim 14, wherein said MOSFETs comprise:
    a first N-type MOSFET (NMOSFET) comprising a drain and a gate coupled to said base of said first transistor;
    a second NMOSFET comprising a drain coupled to a source of said first NMOSFET and a source coupled to a ground;
    a bias voltage coupled with a gate of said second NMOSFET; and
    a third NMOSFET comprising a drain coupled to said emitter of said second transistor and a gate coupled to said gate of said first NMOSFET;
    a fourth NMOSFET comprising a drain coupled to a source of said third NMOSFET, a gate coupled to said gate of said second NMOSFET, and a source coupled said ground.

16. The circuit of claim 10, wherein said second current mirror is comprised of Metal Oxide Semiconductor Field Effect Transistors (MOSFETs).

17. The circuit of claim 16, wherein said MOSFETs comprise:
    a first P-type MOSFET (PMOSFET) comprising a source coupled to said base of said first transistor;
    a first N-type MOSFET (NMOSFET) comprising a drain coupled to a drain and a gate of said first PMOSFET; and
    a second NMOSFET comprising a drain coupled to said source of said first NMOSFET and a source coupled to a ground.

18. The circuit of claim 17 wherein said MOSFETs further comprise:
    a second PMOSFET comprising a gate coupled to said gate of said first PMOSFET and a source coupled to said base of said second transistor;
    a third NMOSFET comprising a drain and a gate coupled to a gate of said first NMOSFET and a drain of said second PMOSFET; and
    a fourth NMOSFET comprising a drain and a gate coupled to a source of said third NMOSFET and a gate of said second NMOSFET, and a source coupled to said ground.

19. A method of canceling a base current in a first transistor, said method comprising:
   receiving matching input currents on an emitter of a first transistor and an emitter of a second transistor;
   mirroring said input current from said first transistor less an emitter current from said first transistor to said emitter of said second transistor with a first current mirror;
   mirroring a base current from said first transistor to a base of said second transistor with a second current mirror; and
   canceling out said base current of said first transistor by drawing a current equal to said base current of said second transistor from said base of said first transistor with said second current mirror.

20. The method of claim 19 further comprising maintaining a voltage on said base of said second transistor at an equivalent level of a voltage on said base of said first transistor.

* * * * *